INVENTORS
MICHAEL WIENAND
ADOLF RISTAU

BY Burgess Dinklage & Sprung
ATTORNEYS

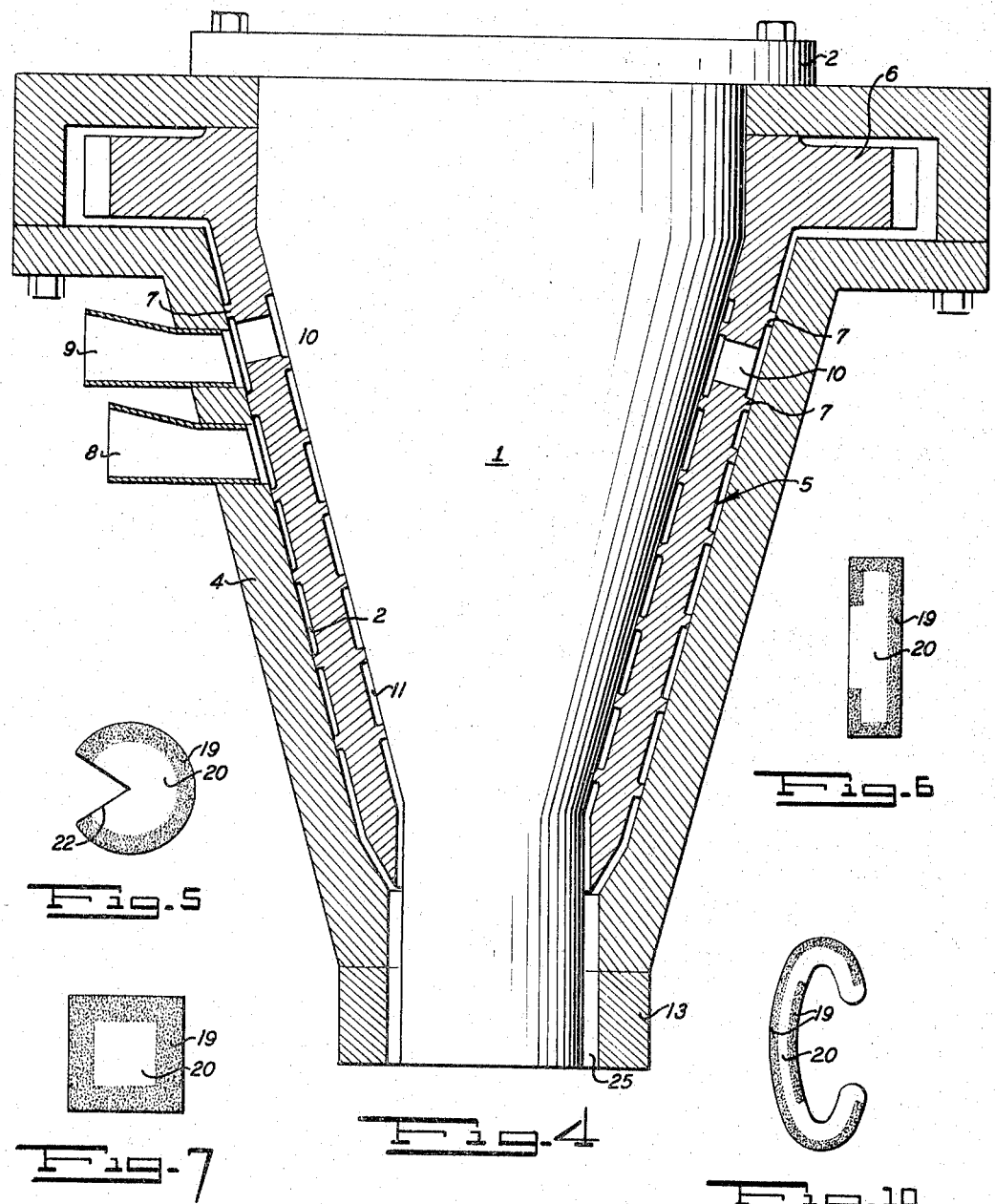

United States Patent Office 3,314,108
Patented Apr. 18, 1967

3,314,108
EXTRUDER
Michael Wienand, Siegburg, and Adolf Ristau, Troisdorf, Germany, assignors to Dynamit Nobel Aktiengesellschaft, Cologne, Germany
Continuation of application Ser. No. 314,560, Oct. 7, 1963. This application Sept. 15, 1966, Ser. No. 579,784
Claims priority, application Germany, Oct. 11, 1962, D 40,033
5 Claims. (Cl. 18—12)

This application is a continuation of application Ser. No. 314,560, filed Oct. 7, 1963, now abandoned.

This invention relates to extruders, and, more particularly, is suitable for production of hollow bodies such as tubes formed of one or more materials, and solid bodies of various selected shapes formed of one or more materials.

The known single-spindle or multi-spindle worm type extruding machines have the disadvantage that, in the manufacture of hollow shapes, such as tubes, for example, the mandrel of the die is fastened or supported in the nozzle by means of struts, perforated discs or the like. Such supporting means disturb the flow of the material, breaking it up, and the material must be worked back together after it has passed the supporting means.

Now, it has been found that it is possible with a hollow worm to avoid these disadvantages of the known machines, and that still other advantages can be achieved which are important in the manufacturing process. Thus, these are the simultaneous extrusion of materials of different colors and/or substances. This is possible if the inner and the outer passages of the hollow worm are supplied separately, and hence composite articles can be made. It is true that it is then no longer possible to work with mixing and pressure-equalizing opening in the manner described in Auslegeschrift No. 1,092,186, but it has been found that the desired distribution of the two colors and/or substances can be achieved either through the design of the worm convolutions or, better, through appropriate proportioning of the feed.

In comparison with the prior art single-spindle worms which are constructed with a length of 20 to 30D, the extruders of the invention, when the worm section is cylindrical, preferably have a length of less than about 10D. With greater lengths, excessive floating may be encountered, and the shorter lengths provide more accurately dimensioned products. Greater mandrel lengths and a more rigid mounting of the mandrel can be achieved when the mandrel is tapered and the hollow worm is constructed as a truncated cone.

The extruder of the invention comprises a centrally disposed mandrel member, a divider member disposed radially outwardly of and spaced from the mandrel in opposed relation in respect thereto, so as to provide a first annular space which is disposed between the mandrel and divider, and a casing member disposed radially outwardly of and spaced from the divider in opposed relation with respect thereto, so as to provide a second annular space, this second annular space being disposed between the divider and the casing. Means are provided for serving as a discharge nozzle having a discharge opening for issuance of extruded material. The divider can terminate short of the discharge nozzle opening with the said first and second annular spaces communicating with each other at the locus of divider termination, and the nozzle can include means defining a passageway from the locus of divider termination to the nozzle discharge opening. The extruder further includes a first worm element disposed in said first annular space, and this first worm element serves to mount the mandrel in the divider, and a second worm element in the second annular space, the second worm element serving to mount the divider in the casing member. Means are provided for rotating the first and second worm elements for transportation of material through the first and second annular spaces toward said extruder discharge nozzle.

The extruder can further include a first and second inlet means for, respectively, said first and second annular spaces for introducing material, respectively, thereinto. The first and second inlet means can be disposed along the corresponding worm elements remote from the discharge nozzle means.

The worm elements can be fixedly secured to either of the members defining the annular space in which the elements are disposed. Advantageously, the worm elements are fixedly secured to the divider member. Means are provided for rotating the worm elements, as for example, means for rotating the divider, when the worm elements are secured to the divider.

The invention is further described in reference to the accompanying drawings, wherein:

FIG. 4 is a plan view, in cross-section, of an extruder characterized in that the principal working members thereof are conical in form;

Figure 3:
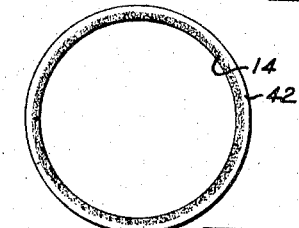
FIG. 3 is an end view of a tubular product as can be produced with an extruder as is shown in FIG. 1.

FIGS. 5, 6, 7, 8, 9, and 10 are end views of products as can be produced with various modifications of an extruder as is indicated in FIG. 3.

In the various views of the drawing, like reference characters refer to corresponding parts.

Figures 1, 2:
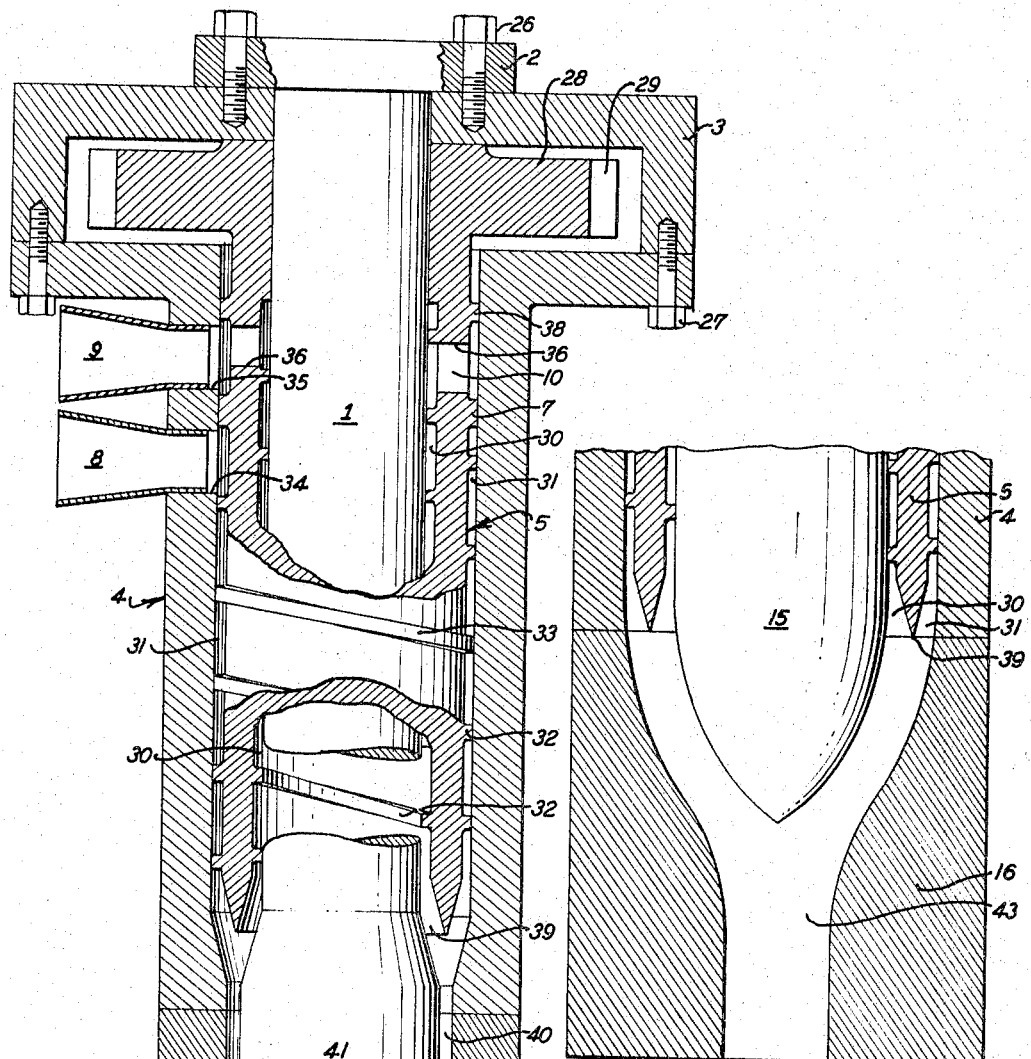
FIG. 1 is a plan view, in cross-section, of an extruder according to the invention.
FIG. 2 is a plan view, in cross-section, of the discharge end of an extruder of modified construction with respect to that shown in FIG. 1.

Referring to FIG. 1, the extruder there shown includes a casing 4 in which there is mounted a worm member 5 and a mandrel 1. The mandrel 1 extends from the rear of the extruder, where the mandrel terminates in a flanged end 2, to which the mandrel is integrally joined, to the extruder discharge opening 25. The mandrel is fixedly secured by bolting 26 to the end cover 3 of the casing 4, and the end cover 3, in turn, is fixedly secured to the body portion of the casing by bolting 27. The worm member has a gear section 28 integrally joined therewith adjacent the rear end of the worm member, and this gear section is provided with gear teeth 29, which are driven by drive means (not shown) for rotating the worm member in the extruder casing 4. Thus, the worm member 5 is rotated in the extruder with respect to the mandrel 1 and the casing 4.

The worm member 5 is spaced along its working length from, respectively, the mandrel 1 and the casing 4, so as to provide a first annular space 30 disposed between the mandrel and the worm member 5, and a second annular space 31 disposed between the worm member and the casing. Thus, the worm member serves as a divider member, disposed between the mandrel and the casing.

First worm elements 32 are integrally joined with the inner surface of the worm member 5, and second worm elements 33 are integrally joined to the outer surface of the worm member 5, and these worm elements are disposed, respectively, in the first annular space 30 and the second annular space 31. Thus, rotation of the worm member 5 will serve to advance material in the respective annular spaces, therethrough toward the discharge opening 25 of the extruder.

Means are provided for, respectively, introducing material into the first annular space 30 and the second annular space 31. Thus, for introducing material into the second or outer annular space 31, there is provided an inlet 8 which is received in the passageway 34 which extends radially through the casing 4 to communication with the outer annular space 31. For introduction of material into the first annular space 30, which is the annular space, there is provided an inlet 9 which is received in the passageway 35, which extends radially through the casing 4 to communication with the outer annular space 31, and this inlet means to the inner annular space further includes a plurality of bores 36 which extend radially through the worm member 5 and communicate with the inner annular space. To isolate the inlet means to the outer annular space and the inlet means to the inner annular space, a seal in the form of a radially outwardly extending ring 7 integral with the worm member 5, is provided. This seal is in sliding surface contact with the casing and the clearance between the seal and the casing is appropriate to provide a suitable seal. Further, to isolate the gear section 28 of the worm element, a rear seal 38 is provided. This seal is formed in a manner similar to seal 7.

The extruder is provided with a discharge nozzle 13. The worm member 5 terminates short of the extruder discharge opening 25, at the end 39 of the worm member adjacent the discharge opening 25. At the end 39 of the worm member 5, the inner annular space 30 and the outer annular space 31 communicate with each other, and from this locus where the annular spaces come together, to the discharge opening 25, the casing 4 together with the discharge nozzle 13 define with the mandrel 1, a passageway 40 for the material being worked. The mandrel has an enlarged end portion 41, proportioned to provide a product as is desired.

Products such as are shown in FIG. 3 can be produced with apparatus as shown in FIG. 1. The product shown in FIG. 3 is a tubular element of cylindrical form having an inner portion 14 of one color, and an outer portion 42 of another color.

In the embodiment shown in FIG. 2, the mandrel end 15 comes to a point, and material issuing from the inner annular space and the outer annular space 31, comes together in the passageway 43 which leads to the extruder discharge 44. With such apparatus, solid as distinct from tubular products can be produced. Such products can be composites of materials of different color or of materials of different composition. With a device as is shown in FIG. 2, various shapes can be produced. Thus, the discharge nozzle 16 can be formed in a manner to provide products of varied cross-section. Such products can be characterized by an inner core portion 20 of waste or inexpensive material, and an outer covering portion 19, of new or more costly material. In the form shown in FIG. 5, the discharge nozzle is provided with appropriate means for effecting a cut-out 22; for the form shown in FIG. 6, suitable cut-out and shaping means are provided so that a variegated structure is obtained; in FIG. 7, a rectangular form is obtained; in FIG. 8, a cylindrical form is obtained; in FIG. 9, an elliptical form is obtained; and in FIG. 10, a C-form suitable for services such as, for example, hand rails, is obtained.

In the embodiment shown in FIG. 4, the mandrel member 1, the worm member 5, and the casing member 4 are each of conical form. As is discussed above, this construction as compared with a cylindrical form for the extruder members, permits utilization of longer length mandrels.

The extruder of the invention can be provided with heating and cooling sections as is desired.

The extruder of the invention can comprise two annular spaces, as is described above, or can be constructed with but one annular space. As set forth above, where two annular spaces are provided, the equipment is well suited to the production of composite articles. Where one annular space is used, the extruder is suitable for production of products formed of but one material.

In the embodiments wherein but one annular space is provided, the extruder includes an elongated casing having a mandrel disposed axially therein and spaced from the walls thereof. This casing has a material inlet end for receiving material to be extruded, and a material outlet end for issuance of extruded product. The equipment further includes a worm conveyor means within the casing between the mandrel and the casing and including worm elements for transportation of material between the mandrel and the casing from the casing inlet toward the casing outlet end. The worm conveyor terminates short of the casing outlet end, and the worm conveyor serves to mount the mandrel in the casing.

While the invention has been described with respect to particular embodiments thereof, these embodiments are merely representative and do not set forth the limits of the invention.

What is claimed is:
1. An extruder comprising:
 (a) a centrally disposed mandrel member;
 (b) a divider member disposed radially outwardly of and spaced from the mandrel in opposed relation with respect thereto providing a first annular space, said first annular space being between the mandrel and divider;
 (c) a casing member disposed radially outwardly of and spaced from the divider in opposed relation with respect thereto providing a second annular space, said second annular space being between the divider and the casing;
 (d) means defining an extruder discharge nozzle having a discharge opening for issuance of extruded material;
 (e) the divider terminating short of the discharge nozzle opening, said first and second annular spaces communicating with each other at the locus of divider termination;
 (f) the nozzle including means defining a passageway from the locus of divider termination to the nozzle discharge opening;
 (g) a first worm element in said first annular space and fixedly secured to the divider, said first worm element serving to mount the mandrel in the divider;
 (h) a second worm element in said second annular space and fixedly secured to the divider, said second worm element serving to mount the divider in the casing member;
 (i) and including first and second inlet means for, respectively, said first and second annular spaces for introducing material, respectively, thereinto, said first and second inlet means being disposed along the corresponding worm elements remote from the discharge nozzle means;
 (j) means sealing said first and second annular spaces from each other for preventing combining of material from the first and second inlet means prior to introduction of the material into the first and second annular passageways;
 (k) means for rotating the divider to thereby rotate the first worm element and the second worm element for transportation of material through the first and second annular spaces toward said extruder discharge nozzle, said rotating means being disposed at the end portion of the divider remote from said discharge nozzle;
 (l) said casing having an extension enclosing said means for rotating the divider;
 (m) said mandrel being fixedly secured to said casing extension at the end thereof remote from said discharge nozzle.
2. An extruder according to claim 1, said second inlet means including a radially extending passageway through said casing communicating with said second annular passageway, said first inlet means being disposed upstream of said second inlet means and including a passageway extending through said casing member and a passageway extending through said divider, the passageway extending through the divider communicating with said first annular passageway, said sealing means comprising a seal disposed in said second annular space separating the second inlet passageway means from the first inlet passageway means.

3. Extruder according to claim 2, said sealing means comprising a ring disposed in said second annular space between the first and second inlet means.

4. Extruder according to claim 3, the ratio of worm length to diameter being less than about 10.

5. An extruder according to claim 1, the ratio of worm length to worm diameter being less than about 10.

References Cited by the Examiner

UNITED STATES PATENTS 2,764,780  10/1956  Reifenhauser _____ 18—12

FOREIGN PATENTS 372,214  4/1921  Germany.

WILLIAM J. STEPHENSON, *Primary Examiner.*